United States Patent

[11] 3,592,250

| [72] | Inventor | George J. Petroshanoff<br>Torrance, Calif. |
|---|---|---|
| [21] | Appl. No. | 24,421 |
| [22] | Filed | Apr. 7, 1970 |
| [45] | Patented | July 13, 1971 |
| [73] | Assignee | Tridair Industries<br>Redondo Beach, Calif.<br>Continuation of application Ser. No.<br>784,057, Dec. 16, 1968, now abandoned. |

[54] SELF-RETAINED BOLT
6 Claims, 17 Drawing Figs.

[52] U.S. Cl. .................................. 151/6,
151/69
[51] Int. Cl. ................................... F16b 39/00
[50] Field of Search ........................ 151/6, 69,
5, 9, 24, 2; 24/211, 211 N; 85/66

[56] References Cited
UNITED STATES PATENTS
841,025  1/1907  Le Sueur ...................... 151/6

| 1,639,211 | 8/1927 | Campo | 151/9 |
| 3,180,390 | 4/1965 | Ockert | 151/69 |
| 3,208,329 | 9/1965 | Copeland | 151/69 X |
| 3,361,176 | 1/1968 | Jansen | 151/69 X |
| 3,390,712 | 7/1968 | McKay | 151/69 X |

*Primary Examiner*—Ramon S. Britts
*Attorneys*—Smyth, Roston and Pavitt, Donald J. Ellingsberg and Arthur W. Frizak ABSTRACT: A self-retained bolt which may include a head, a shank having threads thereon, a pawl mounted for generally radial movement within the shank and means for biasing the pawl radially outwardly. A nut can be threaded onto the bolt for cooperation therewith in securing together two or more members. The pawl acts in various ways to prevent inadvertent separation of the nut and bolt and/or the bolt and the members being fastened together.

PATENTED JUL13 1971

INVENTOR:
George J. Petroshanoff

ATTORNEYS

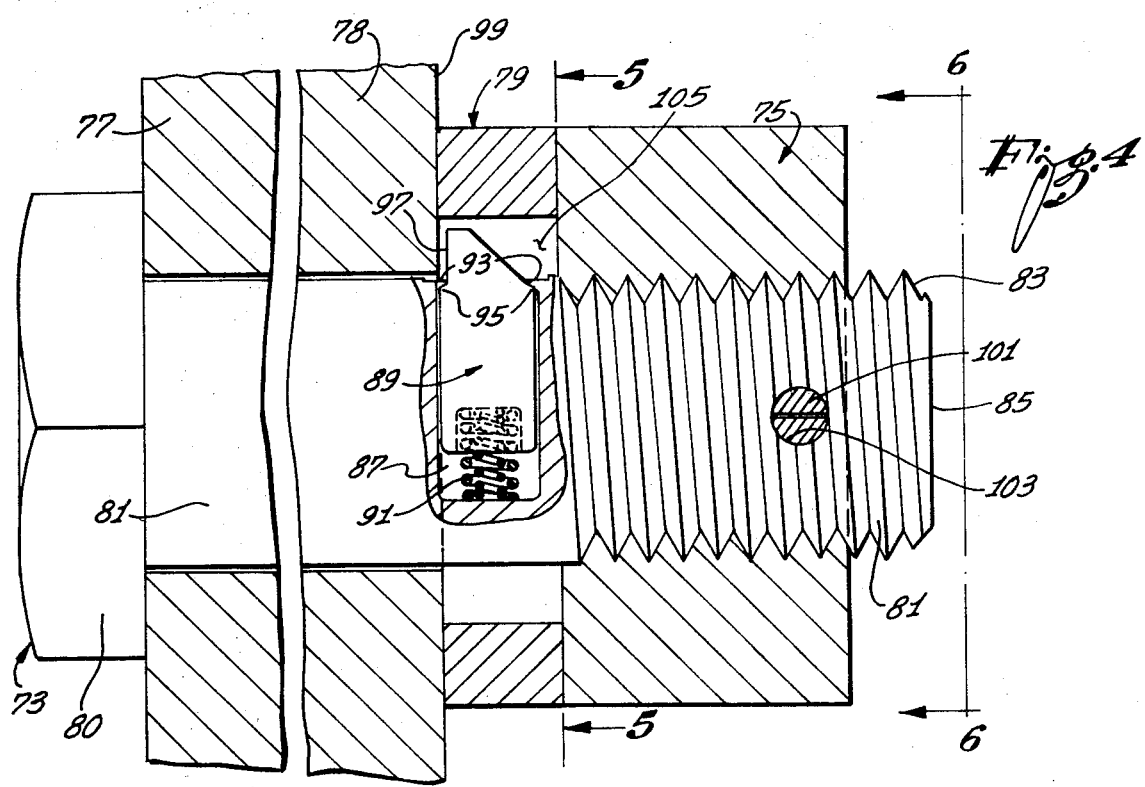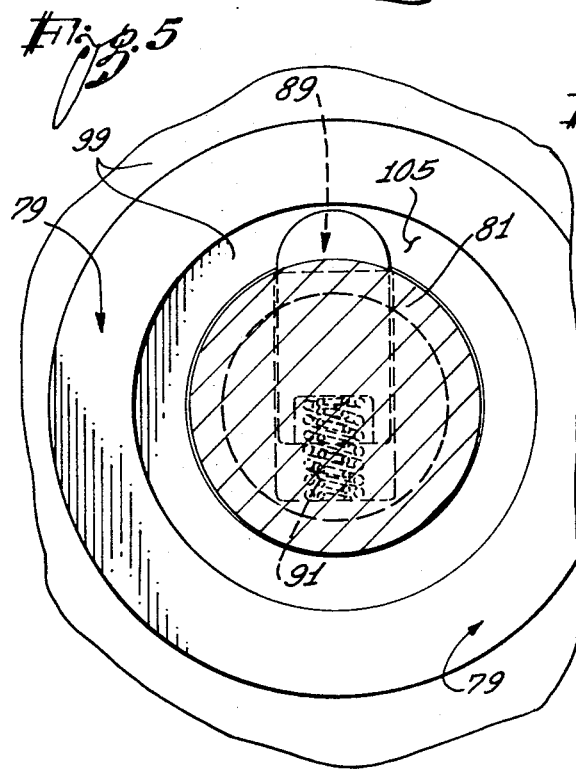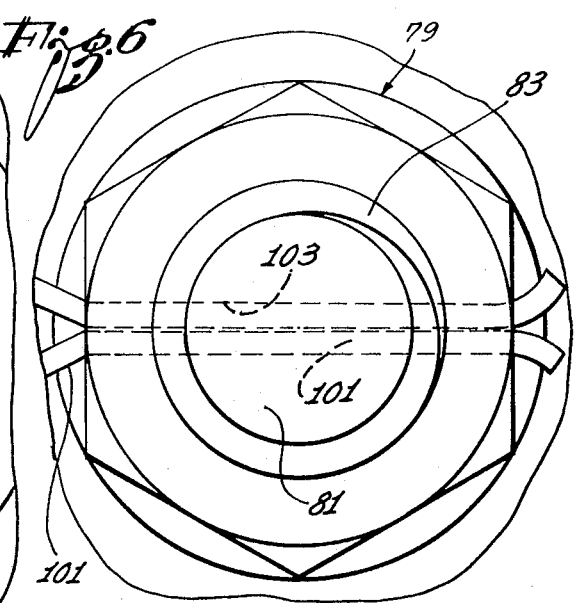

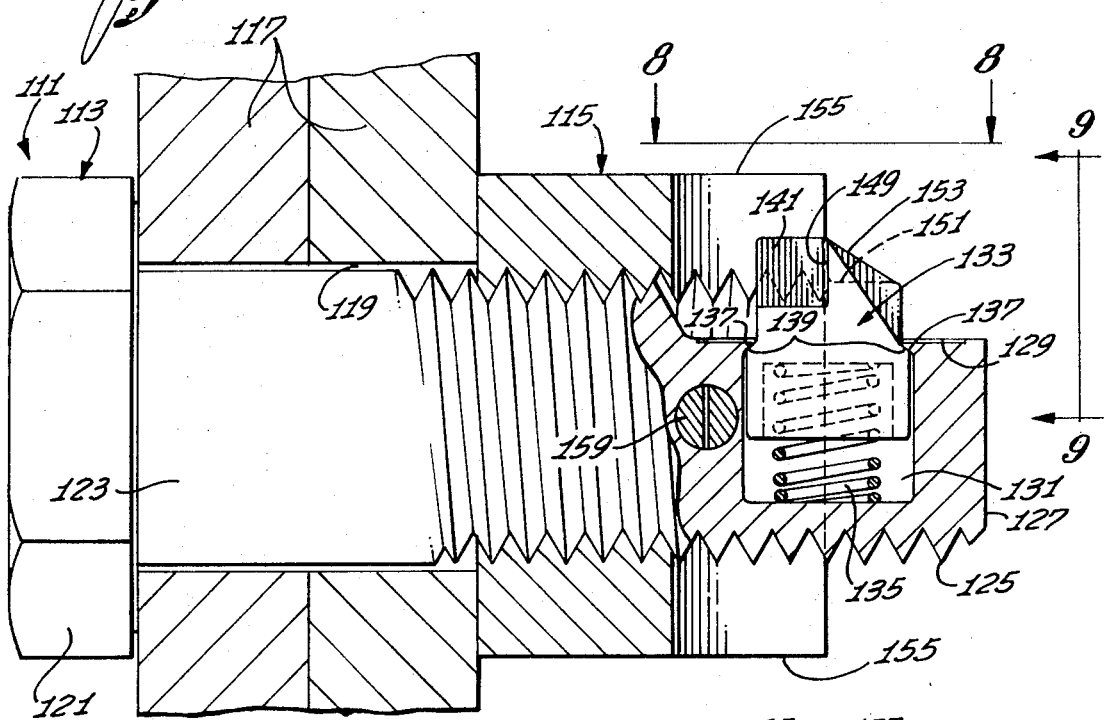
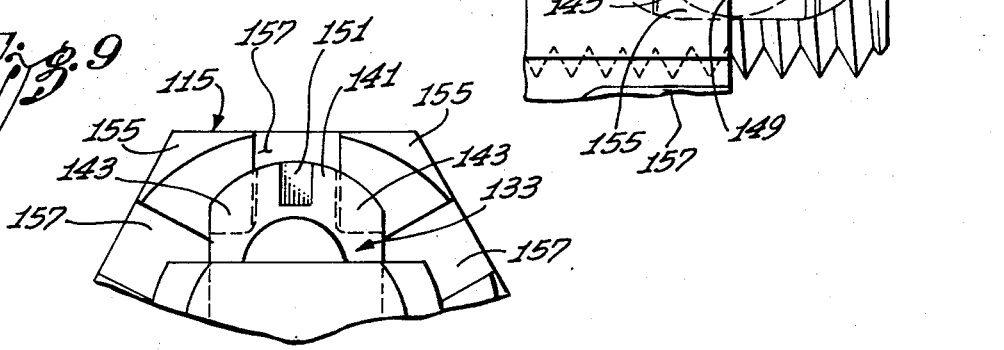

INVENTOR:
George J. Petroshanoff

ATTORNEYS

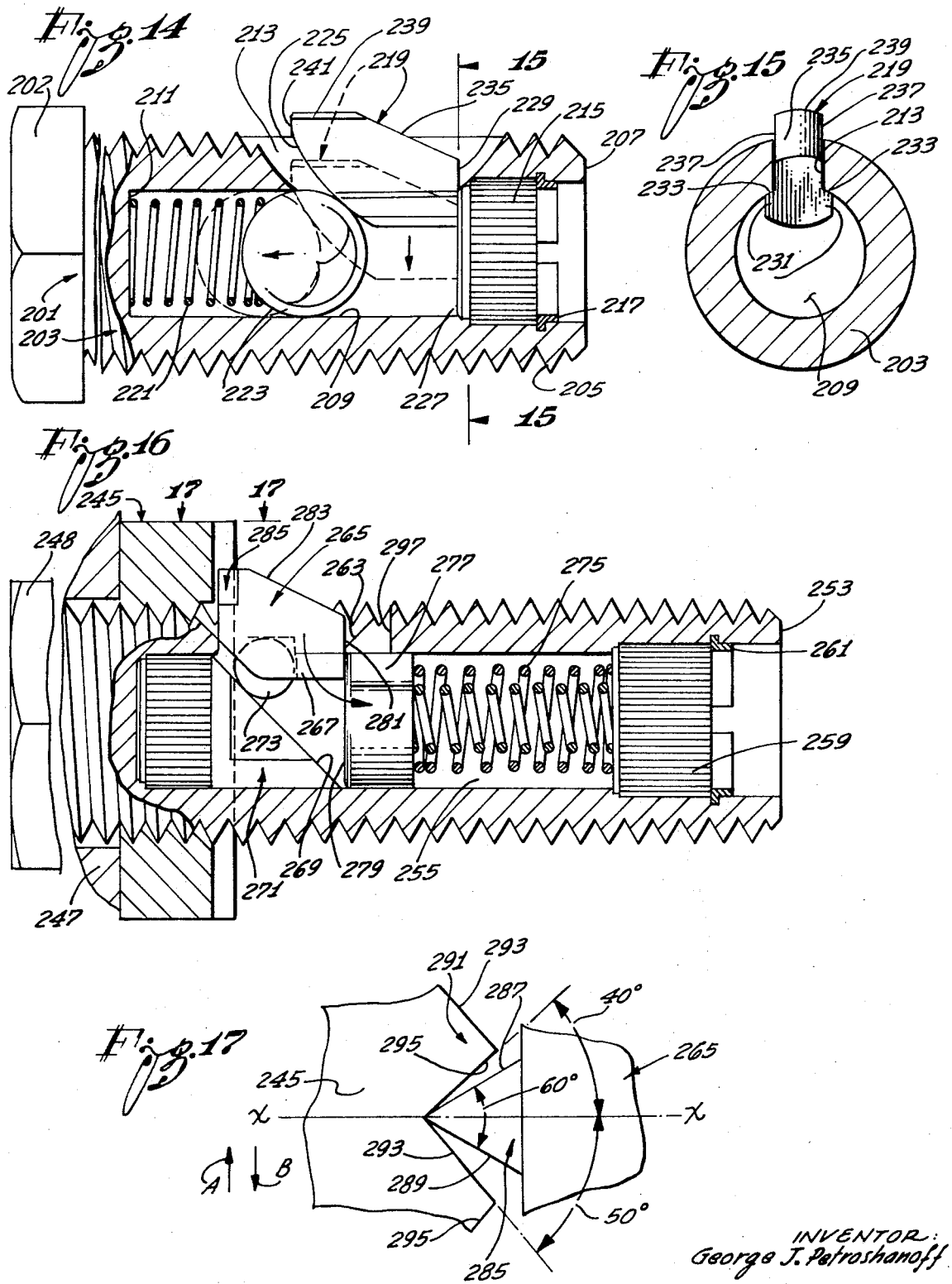

SELF-RETAINED BOLT

This application is a continuation of copending application, Ser. No. 784,057, filed Dec. 16, 1968, now abandoned.

Nut and bolt fasteners have been used for many years, and there is considerable prior art directed to problems associated with bolt retention and locking the nut and bolt together. Some prior art devices have used radially movable members which cooperate with the nut in an effort to obtain some nut-locking effect. The use of such radially movable members has caused some problems with respect to obtaining a positive nut lock, mounting and retaining the radially moving member in the bolt, excessive weakening of the bolt as a result of drilling the bore for the radially movable member, etc. These problems are oftentimes accentuated when the bolt is subjected to vibration which tends to rapidly loosen the nut.

The present invention provides numerous concepts relating to a self-retained bolt with nut lock features, which concepts generally overcome the difficulties experienced heretofore with prior art devices. A bolt constructed in accordance with this invention includes a head, a shank having threads thereon, a pawl mounted in a recess in the bolt for generally radial movement relative thereto and biasing means for urging the pawl radially outwardly. The bolt may extend through one or more members such as panels having generally axially aligned apertures therein for receiving the shank of the bolt. The pawl is movable generally radially between an extended position in which it performs a panel or nut locking function and a retracted position in which it permits passage of the nut and/or panel thereover. The pawl is advantageously retained within the recess by a shoulder formed integrally thereon and a cooperating stop formed integrally with the bolt.

According to one concept of the present invention, the pawl is located in a recess or bore which is located axially outwardly of the nut when the nut and bolt are joining the two panels. The second of the bolt between the head and the nut is subjected to tension as a result of the tightening of the nut. With the present invention, the bore for the pawl does not weaken the section of the bolt subjected to tension because this bore is not located within such section. The pawl nevertheless positively prevents unintended separation of the nut and bolt. If the nut is castellated, the pawl is preferably wider circumferentially than the circumferential dimension of the slot in the castellated nut. With this construction, the pawl cannot be urged into the slots to lock the nut against rotation as the nut is being threaded into the position in which it is axially separated from the pawl.

Another concept of the present invention, which is applicable where maximum strength of the bolt in tension is not a requirement is to position the pawl so that it will lock the panels together if the nut is inadvertently not screwed on the bolt. According to this concept of the invention, the pawl is positioned axially inwardly of the nut, i.e. between the nut and the head of the bolt. Preferably, the spacing between the head of the bolt and the pawl is selected to substantially conform to the thickness of the panels therebetween so that the pawl and head of the bolt will hold the panels together relatively tightly even without the presence of the nut.

A feature of the present invention is the construction of a pawl which positively locks the nut against both rotational and axial movement in a direction tending to separate the nut and bolt. A positive lock is obtained when the pawl is nonresponsive or unmovable in response to the axial or rotational forces tending to separate the nut and bolt. Thus a positive lock is achieved when the pawl cannot be cammed by these separation forces to the retracted position. This can be distinguished from a cam or ball-type spring detent which can be easily cammed by the nut to the retracted position thereof to permit separation of the nut and bolt.

A preferred form of pawl which has excellent positive locking qualities against both rotational and axial forces includes an antirotation portion and an axial stop portion. This type of pawl is preferably used with a castellated nut which includes a plurality of axially extending fingers spaced circumferentially by slots. The antirotation portion is adapted to be received in one of the slots of a castellated nut and the axial stop portion is adapted to simultaneously engage or substantially engage the end faces of one or more fingers of the castellated nut. With this construction, the antirotation portion locks the nut against rotation while the axial stop portion prevents axial movement of the nut off of the end of the bolt. Both of these portions of the pawl preferably have straight face portions which are noncamable and therefore provide a positive lock.

The pawl described in the preceding paragraph is preferably mounted in a radially extending bore in the shank. To minimize the size of this bore, the antirotation portion need not be received therein, but rather a section of the shank can be cut away and the antirotation portion can be retracted therein in the retracted position.

The present invention also facilitates construction of the bolt. This can be accomplished by the formation of an axial bore extending axially inwardly from the end face of the shank and a radial slot which extends radially inwardly from the circumferentially extending surface of the bolt and communicates with the bore. The slot may be axially spaced from the end face of the shank. The axial bore is sufficiently large to permit insertion of the pawl therein. The pawl can be easily installed in the shank, by inserting the pawl into the end of the axial bore and then moving the pawl to the position in which it is radially aligned with the slot. The biasing means may be similarly installed, if desired, and a shoulder formed integrally with the pawl is engageable with the wall of the bore adjacent the slot to prevent separation of the pawl and shank.

The present invention also teaches the use of a bolt in which the pawl biasing means is in the form of a spring which is compressible axially relative to the shank of the bolt. An advantage of this feature of the invention is that springs can have substantial length and/or diameter and dual springs may be easily utilized. The use of an axially compressible spring is particularly adapted for use in combination with a bolt having an axial bore and a radial slot.

With some applications it is desirable to provide a pawl which will provide a nut lock at many axial positions of the nut. The present invention teaches that this desirable result can be accomplished by providing a pawl which follows the nut axially as it is tightened on the bolt. According to a preferred practice of this form of the invention, the recess in which the pawl is mounted has an axial length greater than the axial dimension of the pawl and the biasing means for urging the cam radially outwardly also urges the pawl axially inwardly toward the head of the bolt. Thus, the pawl moves radially outwardly and axially inwardly in moving from the retracted position to the extended position. A cam can be used to advantage in causing movement of the pawl along the desired path.

This last-mentioned feature of the invention may be advantageously employed with a nut having serrations formed in the outer end face thereof and the pawl may have a locking portion adapted to cooperate with the serrations to retain the nut against axial and rotational movement. If desired, the serrations may be formed at an angle so that the nut can be rotated against some resistance to tighten the same and against a greater resistance to remove the nut.

The invention both as to its organization and method of operation together with further features and advantages thereof may best be understood by reference to the following description taken in connection with the accompanying drawings in which:

FIG. 4 is a fragmentary elevational view partially in section of a second form of fastener in which the pawl is positioned axially inwardly of the nut.

FIG. 5 is a sectional view taken along line 5-5 of FIG. 4.

FIG. 6 is an end elevational view taken along line 6-6 of FIG. 4.

FIG. 7 is an elevational view partially in section similar to FIG. 1 illustrating a third form of the invention in which the pawl positively retains the nut both rotational and axial movement relative to the shank;

FIG. 8 is a fragmentary plan view taken along line 8-8 of FIG. 7;

FIG. 9 is a fragmentary and elevational view taken along line 9-9 of FIG. 7.

FIG. 14 is an elevational view partially in secton of a sixth form of bolt in which the biasing means for the pawl is compressible axially of the shank of the bolt;

FIG. 15 is a sectional view taken along line 15-15 of FIG. 14.

FIG. 16 is an elevational view partially in section of a seventh form of the present invention in which the pawl is movable axially and radially; and FIG. 17 is a top plan view taken along line 17-17 of FIG. 16.

Figure 1:
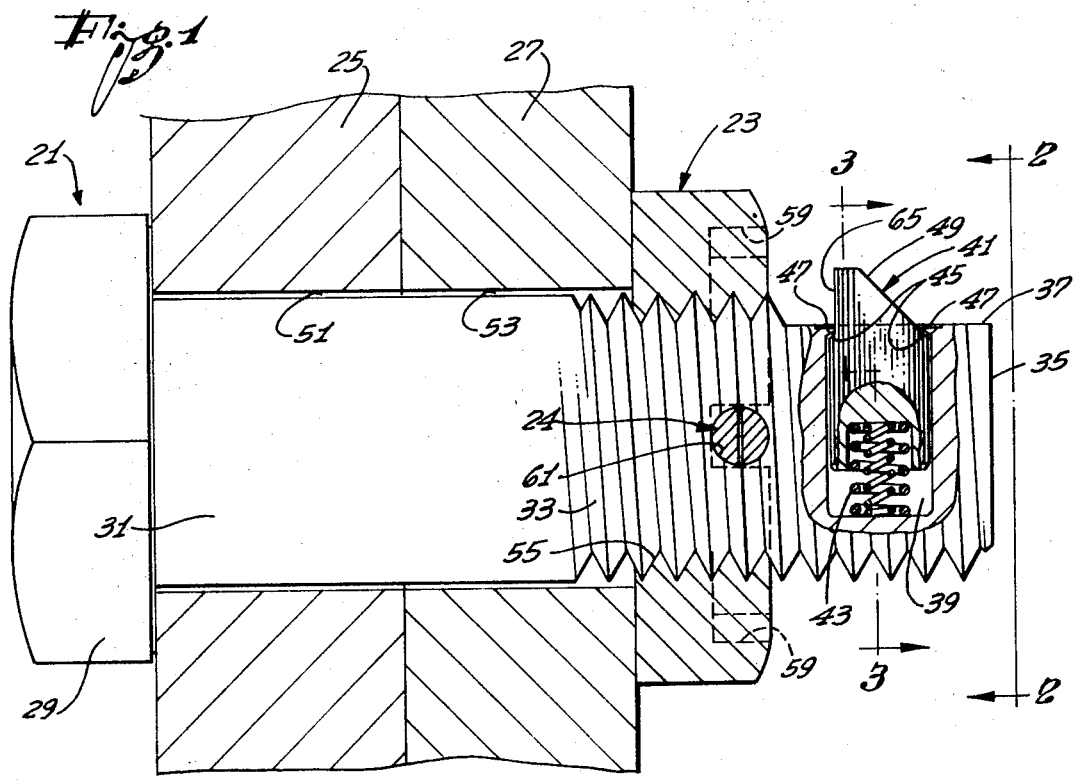
FIG. 1 is a sectional view through a fastener and two panels interconnected thereby.

Referring to the drawings and in particular to FIG. 1 thereof, reference numeral 21 designates a bolt constructed in accordance with the teachings of this invention. The bolt 21 is adapted to cooperate with a nut 23 and a wirelike element such as a cotter pin 24 to retain a plurality of members such as two panels 25 and 27.

The bolt 21, which may be constructed of a suitable metal such as steel includes a head 29 and a shank 21 with the shank having external threads 33 thereon. The shank 31 may be at least substantially cylindrical and the threads 33 extend from an outer end face 35 of the shank inwardly toward the head 29 and terminate in axially spaced relationship to the head.

The shank 31 has a flat surface or region 37 extending axially inwardly from the end face 35. The shank 35 has a recess in the form of a radially extending bore 39 which opens at the flat surface 37.

The bolt 21 also includes a pawl 41 which is mounted for generally radial movement within the bore 39. The pawl 41 is movable radially between a retracted position in which it lies radially inwardly a sufficient amount so that it does not prevent movement of the nut 23 thereover and an extended position in which it positively blocks movement of the nut 23 thereover from the left to the right as viewed in FIG. 1. Biasing means in the form of a pair of springs 43 urge the pawl radially outwardly to the position shown in FIG. 1. The pawl 41 is retained within the bore 39 by a pair of shoulders 45 integral with the pawl 41 and by a pair of stops 47 formed integrally with the shank 41. The stops 47 project into the bore 39 adjacent the outer end thereof. The stops 47 may be formed by a staking operation. The pawl 41 can be moved radially inwardly by force sufficient to overcome the biasing force of the springs 43.

Figure 3:
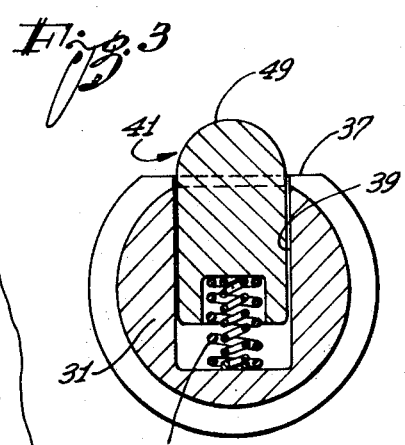
FIG. 3 is a sectional view taken along line 3-3 of FIG. 1.

The pawl 41 is constructed of a strong rigid material such as a suitable metal and has a sloping surface 49 which slopes downwardly as it extends toward the end face 35 as shown in FIG. 1. The sloping surface 49 is preferably rounded in cross section and is shown in FIG. 3.

Of course, the bolt 21 may be utilized in various environments to interconnect many different kinds of members and the panels 25 and 27 are purely illustrative. The panels 25 and 27 have aligned apertures 51 and 53, respectively, through which the shank 31 of the bolt extends.

The panels 25 and 27 are held in assembled relationship on the bolt 21 by the nut 23. The nut 23 has internal threads 55 sized to cooperate with the external threads 33 on the shank 31. The nut 23 is a castellated nut and has a plurality of axially extending fingers 57 adjacent pairs of which are spaced circumferentially by slots 59.

Figure 2:
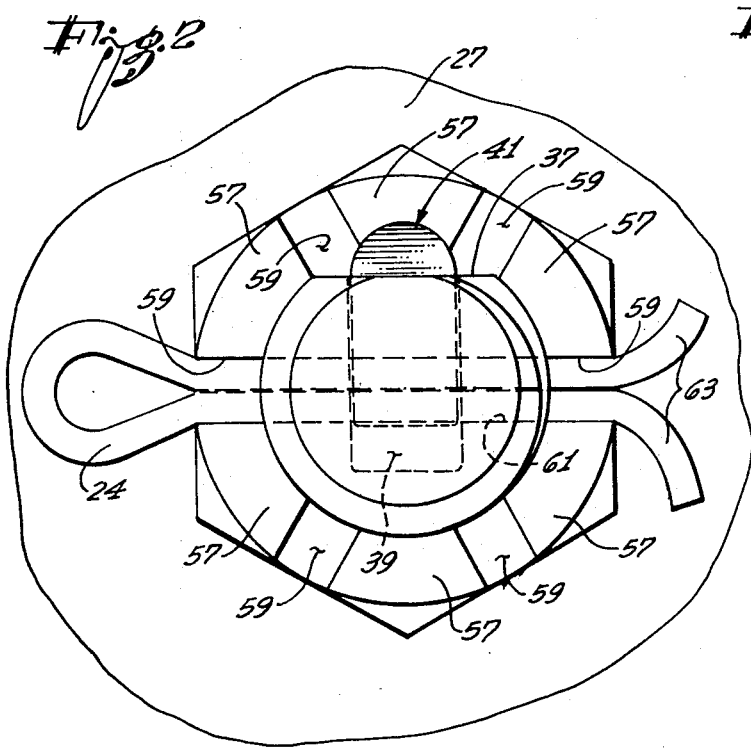
FIG. 2 is an end elevational view taken along line 2-2 of FIG. 1.

As shown in FIG. 2, the pawl 41 is wider than the circumferential dimension of any of the slots 59, and therefore, the pawl 41 cannot be received within any of the slots 59.

Insertion of the shank 31 through the apertures 51 and 53 of the panels 25 and 27 is facilitated by the sloping surface 49 of the pawl 41 which acts to cam the pawl radially inwardly into the bore 39. With the shank 31 of the bolt 21 projecting through the apertures 51 and 53 of the panels 25 and 27, the nut 23 can be turned onto the threads 33. Because of the slope of the surface 41 shown in FIG. 1 and the arcuate nature of the surface 49 shown in FIGS. 2 and 3, the nut 23 can be turned over the pawl 41. That is, the turning action of the nut toward the head 29 cams the pawl 41 radially inwardly to a position in which it will not interfere with movement of the nut thereover in a direction toward the head 29. Specifically, the arcuate nature of the surface 49 shown in FIGS. 2 and 3 responds to rotational movement of the nut while the incline on the surface 49 shown in FIG. 1 responds to axial travel of the nut to cam the pawl 41 radially inwardly. The nut 23 is then turned to the position shown in FIG. 1 in which it tightly retains the panels 25 and 27 between the head 29 and the nut. To lock the nut 23 in this position, the cotter pin 24 can be inserted through a radially extending bore 61 in the shank 31 and through an opposed pair of slots 59 in the castellated nut 23. End portions 63 of the cotter pin 24 can then be bent in a conventional fashion to lock the pin 24 within the bore 61. In this manner, the nut 23 is positively locked in position.

With the components of the device thus arranged, the nut 23 is spaced axially from the pawl 41. Thus, the section of the nut 21 which is placed in tension as a result of tightening of the nut 23 is the section intermediate the head 29 and the outer end face, i.e. the right end face as viewed in FIG. 1 of the nut 23. As the bore 39 in which the pawl 41 is mounted is not located within such section of the bolt 21, it does not weaken the portion of the bolt which is placed under load.

The pawl 41 nevertheless operates as a nut lock device in that it prevents separation of the nut 23 from the bolt 21. As shown in FIG. 1, the pawl 41 has an inner end face 65 which extends substantially perpendicular to the axis of the shank 41. Thus, should the cotter pin 21 break and the nut 23 be counterrotated, it will strike the end face 65 and thereafter be positively retained by the pawl against axial and rotational movement in a direction tending to remove the nut from the bolt 21.

Although the spacing between the end face 65 and the nut 23 appears substantial in FIG. 1, in actual practice this spacing may be only a very slight clearance gap so that the pawl 41 will become effective as a nut lock almost immediately upon fracture of the cotter pin 24. To retain maximum bolt strength, the cotter pin 24 is preferably spaced 90° circumferentially from the bore 39.

FIGS. 4—6 show a second embodiment of the invention in which the pawl is positioned to retain panels or other members even if the nut is not turned onto the bolt. Generally FIGS. 4—6 show a bolt 73 and a nut 75 used to join a pair of panels 77 and 78. A washer 79 is provided intermediate the panel 78 and the nut 75.

The bolt 73 and the nut 75 are identical to the bolt 21 and the nut 23 of FIGS. 1—3 except as expressly noted herein. The bolt 73 has a head 80 and a shank 81 having external threads 83 thereon extending axially inwardly from an end face 85 thereof. The threads 83 terminate a substantial distance from the head 80 of the bolt 73.

A recess in the form of a radially extending bore 87 projects radially inwardly from the circumferential surface of the shank 81 adjacent the inner end of the threads 83. A pawl 82 which may be identical to the pawl 41 is mounted for radial movement in the bore 87 between extended and retracted positions and is urged radially outwardly by a pair of compression springs 91. The pawl 89 is retained within the bore 87 by a pair of stops 93 integral with the shank 81 and by integral shoulders 95 formed integrally with the pawl 89 as described in connection with FIGS. 1—3. The pawl 89 also has a planar inner end face 97 which confronts an outer surface 99 of the panel 78.

The nut 75 is castellated and is identical to the nut 23. The nut 75 is located in position by a cotter pin 101 which projects through a radial bore 103 in the threaded portion of the shank 81. The axis of the bore 103 is offset 90° from the axis of the recess 87. The washer 79 has an opening 105 therethrough which is sized to receive the shank 81 and the pawl 89 with the latter in the extended position.

In use of the bolt 73, the shank 81 is inserted through the aligned apertures in the panel 77 until the head 80 of the bolt abuts the outer surface of the adjacent panel 77. When the shank 81 is fully inserted into the apertures of the panels 77 and 78, the springs 91 urge the pawl radially outwardly to the extended position as shown in FIG. 4. In the extended position, the inner end face 97 lies closely adjacent or actually engages the outer surface 99 of the adjacent member 77. The end face 97 is planar and generally perpendicular to the longitudinal axis of the shank 81 and therefore positively retains the panels 77 and 78 between the head 80 of the bolt and the pawl 89 without assistance from the nut 75.

The washer 79 is then moved over the shank 81 into the position shown in FIG. 4 and the nut 75 is turned on to the threads 83. The pawl 89 cannot be cammed inwardly by the nut because the pawl is located axially inwardly of the inner end of the threads 83. In addition the pawl 89 is covered by the washer 79. The cotter pin 101 is inserted through the bore 103 as described more fully in connection with the embodiments of FIGS. 1—3 so as to lock the castellated nut 75 in position.

FIGS. 7—9 show a third embodiment of the invention. In this embodiment of the invention the nut is positively locked against both axial and rotational movement relative to the bolt.

FIGS. 7—9 illustrate a fastener 111 which includes a bolt 113 and a castellated nut 115 which cooperate to interconnect a pair of panels 117 having aligned apertures 119 extending therethrough. The bolt 113 has a head 121 and a shank 123 having external threads 125 thereon which extend inwardly from and end face 127 of the shank. The shank 123 has a relatively flat region 129 extending axially inwardly from the end face 127 and terminating well short of the inner end of the threads 125. The flat region 129 lies radially inwardly of the minor diameter of the threads 125.

A radial bore 131 is formed in the shank 123 and opens at the flat region 129. A pawl 133 is mounted within the bore 131 for generally radial movement between extended and retracted positions. The pawl 133 is urged radially outwardly by one or more compression springs 135 and the pawl is retained within the bore 131 by a pair of stops 137 formed integrally with the shank 123 and a pair of cooperating shoulders 139 formed integrally with the pawl and cooperating with the stops as set forth in the above-described embodiments of the invention.

The pawl 133 may be formed of metal or other strong rigid material and has an antirotation portion 141 at the upper end (as viewed in FIG. 7) thereof and a pair of axial stop portions 143. The upper surfaces (as viewed in FIG. 9) of the portions 141 and 143 are arcuate as shown in FIG. 9. As shown in FIGS. 7 and 8, the antirotation portion 141 projects axially inwardly from the stop portions 143 while the stop portions 143 project circumferentially of the antirotation portion 141.

The portion 141 has parallel planar side faces 145 and a flat, planar, inner end face 147. The stop portions 143 have planar end faces 149. A groove 151 circumferentially spaces the two stop portions 143 and forms a channel for receiving an appropriate tool to facilitate depressing of the pawl 133 radially inwardly to the retracted position thereof. The pawl 133 also has a sloping surface 153 to allow camming of the pawl 133 to the retracted position when the bolt is inserted into the apertures 119 and when the nut is being turned on to the shank 123.

The nut 115 is a castellated nut having a plurality of axially extending fingers 153, adjacent pairs of which are separated circumferentially by slots 157. The castellated nut 115 may be identical to the nut 23. A cotter pin 159 may extend through a radial bore 160 of the shank 123 as described hereinabove to provide a second lock for the nut 115.

In operation of the fastener 111, the shank 123 is inserted through the aligned apertures 119 of the panels 117 and the nut 115 is turned onto the threads 125 with the pawl 133 being cammed radially inwardly. As turning of the nut 115 continues, the castellated portion, i.e. the fingers 155 and the slots 157, ultimately become positioned directly radially outwardly of the pawl 133. However, because of the width of the axial stop portions 143, the antirotation portion 141 cannot enter one of the slots 157 until the stop portions 143 are axially space from the nut 115 as shown in FIG. 7. When this occurs, the spring 135 will automatically urge the pawl radially outwardly so that the antirotation portion 141 moves into one of the slots 157. If at this time the nut 115 is not tightened sufficiently, a suitable tool may be inserted in the groove 151 to depress the pawl 133 to the retracted position thereby permitting further tightening of the nut.

When the nut 115 has been tightened sufficiently, the pawl 133 is released and the antirotation portion 141 enters one of the slots 157. At this point, the straight side faces 145 are in substantial engagement with the lateral faces of the adjacent fingers 155 to thereby positively lock the nut against rotation. In addition, the end faces 149 of the stop portions 143 will be in substantial engagement with or only slightly axially spaced from, the end faces of the adjacent fingers 155 to thereby positively prevent axial travel of the nut 115. Thus, the embodiment of FIGS. 7—9 provides a pawl which engages different surfaces of the nut 115 to positively retain the same against both axial and rotational movement of the type which would tend to separate the nut 115 from the nut bolt 113. Of course, to remove the nut 115, the user merely depresses the pawl 133 sufficiently to allow travel of the nut 115 along the shank 123.

Figure 10:
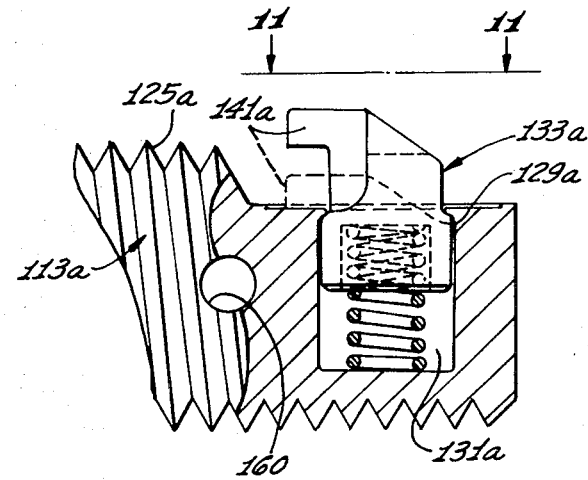
FIG. 10 is a fragmentary elevational view partially in section of a fourth embodiment of the invention which is similar to the embodiment of FIGS. 7-9.
Figure 11:
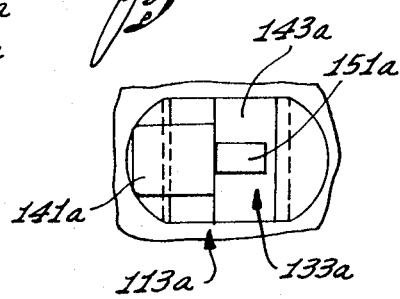
FIG. 11 is a fragmentary plan view taken along line 11-11 of FIG. 10.

FIGS. 10—11 illustrate a portion of a bolt 113a which is identical to the bolt 113 in all respects except those specifically noted herein. The bolt 113a functions like the bolt 113 but possesses the advantage of increased strength due to reduction in size of the bore in which the pawl is mounted. Portions of the bolt 113a corresponding to portions of the bolt 113 are designated with corresponding reference characters followed by the letter $a$.

The bolt 113a has a flat region 129a which is spaced radially inwardly from the minor diameter of the threads 125a. A radial bore 131a opens at the flat region 129a and has a pawl 133a mounted and retained therein in the manner described in connection with FIGS. 7—9. The pawl 133a has an antirotation portion 141a and a pair of axial stop portions 143a with the portions 143 being spaced circumferentially by a groove 151a. The bore 131a has a lesser dimension axially of the bolt 113a than the corresponding dimension of the bore 131 because the antirotation portion 141a is in the form of an overhanging finger which is not received within the bore. The radial dimension between the flat region 129a and the minor thread diameter is slightly greater than the radial dimension of the antirotation portion 141a. Thus, when the pawl 133 is in the retracted position, the portion 141a lies radially inwardly of the minor diameter of the threads 125 $a$ and cannot block passage of the nut thereover. The bolt 113a may be used in the manner shown in FIGS. 7—9 and the pawl 133a may cooperate with a nut as shown in FIGS. 7—9. An advantage of this embodiment of the invention is that the dimension of the recess 133a axially of the bolt may be reduced to the extent of the overhang of the antirotation portion 141a. This increases the strength of the bolt 113a.

Figure 12:
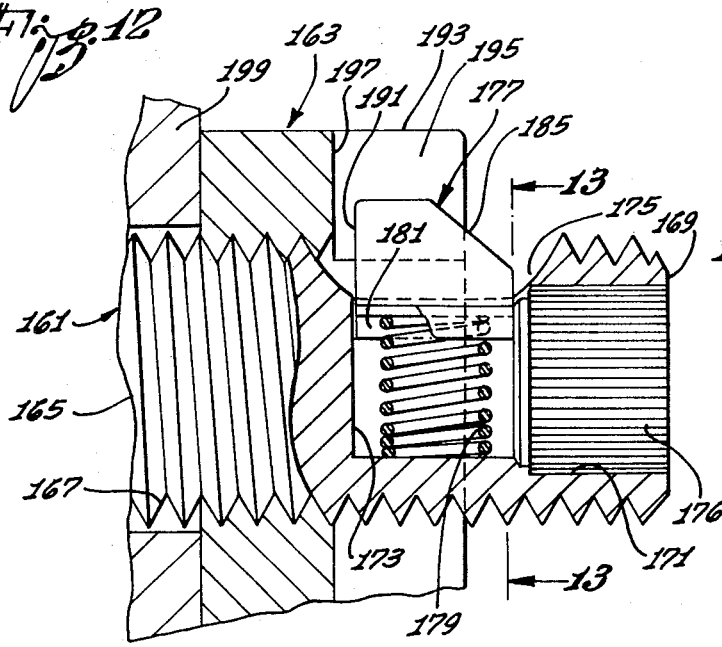
FIG. 12 is an elevational view partially in section of a fifth form of fastener in which the bolt has an axial bore for insertion of the pawl therethrough.
Figure 13:
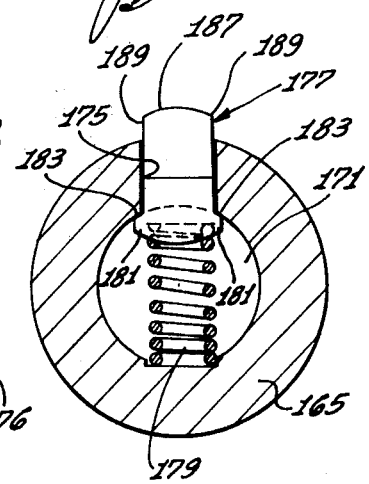
FIG. 13 is a sectional view taken along line 13-13 of FIG. 12.

The embodiments of FIGS. 12—17 all relate to self-retained bolts containing axial bores through which a pawl may be inserted. The simplest form of construction is shown in FIGS. 12 and 13 which illustrate a bolt 161 and a castellated nut 163 which may be identical to the bolt 21 and the nut 23, respectively, except as specifically pointed out herein. The bolt 161 includes a head not shown, a shank 165 having external threads 167 thereon extending inwardly from an end face 169. The shank 161 has an axial bore 171 extending inwardly toward the head thereof from the end face 169 and terminating in an end wall 173. The shank 161 also has a radially extending slot 175 which extends radially inwardly and joins the axial bore 171 to define therewith a recess. The outer end of the bore may be closed with a suitable plug 176.

A pawl 177 is mounted in the bore 171 and the slot 175 for generally radial movement between extended and retracted positions. The pawl 177 is resiliently urged toward the extended position by a spring 179 which lies within the bore 171. The pawl 177 has a pair of shoulders 181 formed integrally therewith which project laterally of the pawl and cooperate with stops 183 integral with the shank 165 to prevent the spring 179 from urging the pawl radially outwardly out of the bore 171. As shown in FIG. 13, the stops 183 are defined by surface regions of the wall of the bore 171 adjacent the slot 175 and the shoulders 181 provide the pawl 177 with a dimension circumferentially of the shank 165 which is larger than the corresponding dimension of the slot 175.

The pawl 177 has a sloping surface 185 and an arcuate upper surface 187 which permit camming of the pawl to the retracted position when the nut is being turned onto the shank 165 and when the shank is being inserted through apertures of the panels (not shown) which it is to retain. The pawl 177 has straight planar lateral surfaces 189 and an inner end face 191. The lateral surfaces 189 and the inner end face 191 form stops which are nonresponsive to forces directed thereagainst to cam the pawl to the retracted position.

One advantage of this construction is that the bore 171 can be sized to receive the pawl 177. Thus, with the plug 176 removed or prior to the time that the plug is installed, the pawl 177 can be inserted into the bore from the open end thereof and moved axially therein toward the end wall 177. The means for retaining the pawl can then take the form of the shoulders 181 and the stops 183. When the pawl 177 and the spring 179 have been inserted, the plug 176 is suitably secured within the bore 171 to close the outer end thereof.

The embodiment of FIGS. 12 and 13 may be used in many different ways to perform a locking function. For example, the embodiment of FIGS. 12 and 13 may be used as shown in FIGS. 1—3 where the pawl is spaced axially outwardly from the nut or as shown in FIGS. 4—6 where the pawl is located axially inwardly of the nut. For purposes of illustration, however, the pawl 177 is shown cooperating with the castellated nut to directly and positively retain the latter against rotational movement. The castellated nut 163 includes a plurality of axially extending fingers 193 spaced circumferentially by slots 195 and thus, the nut 163 may be substantially identical to the nut 23 (FIGS. 1—3). The circumferential dimension of the pawl 177 is slightly less than the circumferential dimension of each of the slots so that the pawl can fit into the slot with the lateral surfaces 189 thereof confronting and being closely adjacent the adjacent fingers 193. In addition, the end face 191 of the pawl 171 preferably lies closely adjacent an end surface 197 of the slot 195 into which it is inserted. Thus, the surface 189 and the face 191 act to positively prevent axial and rotational movement of the nut 163. The bolt 161 and the nut 163 may be used to retain a plurality of members 199 (only one being shown) in the manner illustrated, for example, in FIG. 7.

The embodiment of FIGS. 14 and 15 combines the features of an axial bore in the shank of the bolt with a spring mounted in such bore and compressible axially of the shank. The embodiment of FIGS. 14 and 15 is identical to the embodiment of FIGS. 12 and 13 except as specifically noted herein.

FIGS. 14 and 15 illustrate a self-retained bolt 201 having a head 202, a shank 203 having external threads 205 thereon extending inwardly toward the head from an end face 207.

The shank 203 has an axial bore 209 extending axially inwardly from the end face 207 and terminating in an end wall 211. A radial slot 213 projects radially inwardly from the circumferential surface of the shank 203 and joins the bore 209.

The outer end of the bore 209 is closed by a plug 215 which is retained within the bore by an annular retainer 217. A pawl 219 is mounted within the bore 209 and the slot 213 for generally radial movement between extended and retracted positions.

It can be seen that the bore 209 terminates axially inwardly of the slot 213 and of the pawl 219 whereas the end wall 173 (FIGS. 12) terminates substantially flush with the face 191 in the embodiment of FIGS. 12 and 13. The additional length of the bore 209 (FIGS. 14 and 15) is utilized to house a coil spring 221, which may be coaxial with the bore, and a cam in the form of a ball 223. With this construction, the spring 221 is compressible axially of the bore 209 and the ball 223 is movable axially within the bore.

The pawl 219 has a cam surface 225 which engages the ball 223 and cooperates therewith to outwardly the spring 221 to urge the cam 219 radially outwardly toward the extended position. Radial movement of the pawl 219 is guided by the ball 223 and by sliding contact between an inner end face 227 of the plug 115 and an outer end face 229 of the cam. In the embodiment illustrated, the faces 227 and 229 are planar and generally perpendicular to the axis of the shank 203 so that movement of the pawl 229 will be radially of the shank. Of course, the surfaces 227 and 229 could be sloped, if desired, to impart some axial movement to the pawl 219 as it moves between the extended and retracted positions.

The pawl 219 has a pair of integral shoulders 231 which cooperate with a pair of stops 233 integral with the shank 203 in the manner described hereinabove in connection with FIGS. 12 and 13 to prevent the spring 221 from forcing the pawl 219 radially outwardly of the slot 213. Similarly, the bore 209 is sufficiently large to permit insertion of the pawl 219 therein from the outer end of the bore as described in connection with FIGS. 12 and 13. The pawl 219 has a sloping surface 235, a pair of planar lateral surfaces 237, an arcuate upper surface 239, and a planar inner end face 241 each of which may function in the same manner as the corresponding portion of the pawl 177 shown in FIGS. 12 and 13.

The bolt 201 may be used in the manner shown in FIGS. 1—3 in which the pawl is spaced axially outwardly from the nut or in the manner shown in FIGS. 4—6 where the pawl is spaced axially inwardly of the nut. Similarly, the pawl 219 may be sized to be received within a slot of a castellated nut as shown in FIGS. 12 and 13. Thus, the bolt 201 may be used in a variety of ways to perform a locking function.

In use of the bolt 201, application of a radial inward force against the pawl 219 causes the cam surface 225 to cam the ball 223 axially toward the head 202 of the bolt 201. This results in compression of the spring 221 in a direction axially of the shank 203. When the radial inward force is removed, the spring 221 is operative to urge the cam 219 upwardly through the ball 223 and the cam 225.

The extended and retracted positions of the pawl 219 are shown in full and dashed lines, respectively on FIG. 14. It can be seen that in the retracted position, the pawl will not interfere with the travel of a nut thereover while in the extended position, it performs a locking function in that movement of a nut or plate member thereover in a direction tending to separate such element from the bolt 201 is prevented.

The embodiment of FIGS. 16 and 17 resemble the embodiment of FIGS. 14 and 15 except that in the former the pawl travels both radially and axially in moving between the extended and retracted positions. FIGS. 16 and 17 illustrate a self-retained bolt 243 cooperating with a nut 245 to retain a plurality of apertured members or panels 247, (only one being shown) together. The bolt 243 includes a head 248, a shank 249 having external threads 251 thereon extending inwardly from and end face 253 toward the head. An axial bore 255 extends axially inwardly toward the head 248 from the end face 253 and terminates in an end wall 257 with the outer end of the bore being closed by a plug 259 which is retained within the bore by an annular retainer 261. A radial slot 263 extends radially inwardly from the circumferential periphery of the shank 249 and communicates with the axial bore 255. A pawl 265 is mounted for axial and radial movement within the slot 263 and the bore 255 between extended and retracted positions. As shown in FIG. 16, the slot 261 has a greater dimension axially of the bolt than the pawl 265 to thereby allow some axial travel of the pawl. The pawl 265 is provided with a pair of laterally extending integral shoulders 267 similar to the shoulders 231 shown in FIG. 15 for cooperating with corresponding integral stops (not shown) formed integrally with the shank 249 substantially as set forth in connection with FIGS. 14 and 15 for retaining the pawl within the bore.

The direction of movement of the pawl 265 is controlled by the contour of a cam surface 269 formed on a cam 271 located within the inner end of the bore 255. As shown in FIG. 16, the bore 255 terminates inwardly of the pawl 265 to thereby provide sufficient room for rigidly mounting the cam 271 within the bore. Although the cam surface 269 may have various contours, in the embodiment illustrated the cam surface is substantially planar and extends at a 45° angle with respect to the axis of the bore 255. Thus, in the embodiment illustrated, the pawl 265 will travel equal distances axially and radially in moving between the extended and retracted positions. A cam follower in the form of a ball 273 is suitably conventionally rotatably mounted within the pawl 265 and is engageable with the cam surface 265. The ball 273 rolls along the cam surface 269 to provide minimum frictional resistance to the movement of the pawl.

A pair of coil compression springs 275 are mounted axially within the bore 255 and act between the plug 259 and an axially movable piston 277. The piston 277 and the pawl 259 have confronting engageable cooperable faces 279 and 281, respectively. Thus, the springs act through the piston 277 to apply an axial force to the pawl 265. Because of the slope of the cam surface 269, this axial force is operative to urge the pawl 265 axially and radially toward the extended position.

The pawl 265 has a sloping surface 283 which is analogous to the sloping surface 185 of the pawl shown in FIGS. 12 and 13 and is provided for the same purpose. The pawl 265 preferably significantly restrains the nut 245 against rotational movement in a direction tending to move the nut off of the shank 249 rather than positively locking the nut on the shank. To this end, the pawl 265 is provided with a tooth 285 extending axially toward the nut 245. The tooth 285 has inclined lateral surfaces 287 and 289 as shown in FIG. 17.

The outer face of the nut 245 is serrated for cooperation with the tooth 285. Specifically, the outer face of the nut 245 includes a plurality of teeth 291 each of which has a pair of lateral surfaces 293 and 295. It can be seen from FIG. 17 that in order to rotate the nut 245, the lateral surfaces of the teeth 291 must cooperate with the lateral surfaces of the tooth 285 to cam the pawl axially an amount sufficient to permit passage of the teeth 291. In order to cam the pawl 265 axially, it is necessary to compress the spring 275 and thus, the force of the spring acts to restrain the nut 245 against rotational movement.

To turn the nut 245 on the shank 249, it can be assumed that the nut 245 will have to be rotated in the direction of the arrow A in FIG. 17. To facilitate rotation of the nut 245 in a direction tending to tighten the same, the surfaces 293 of the teeth 291 preferably form a relatively large angle with an axially extending reference line X-X. Conversely, it is necessary to rotate the nut 245 in the direction of the Arrow B in FIG. 17 to remove the same from the shank 249, and to maximize the retarding effect of such movement, the surfaces 295 of the teeth 291 preferably form a lesser angle with reference line X-X. Thus, the angle provided by the surfaces 295 provide maximum retardation against forces tending to rotate the nut 245 in a direction tending to unthread the latter from the the thread 249. Alternatively, this force differential could be supplied by varying the angle that the surfaces 287 and 289 form relative to reference line X-X.

In operation of the embodiment of FIGS. 16 and 17, rotational movement of the nut 245 in the direction of the arrow A (FIG. 17) can be accomplished to tighten the the nut as the pawl 265 is cammed axially by the cooperation between the teeth 291 and the tooth 285. As the pawl 265 can travel axially under the influence of the spring 275, the tooth 285 can follow the axial movement of the nut 245 to provide a relatively large axial range in which the pawl 264 is operative to retain the nut. Removal of the nut 245 is facilitated by manually moving the pawl 265 to the retracted position prior to beginning unscrewing of the nut. It should be noted that in ordinary usage of the device, there are no forces except the weight of the pawl 265 which would tend to move the latter radially inwardly. Thus, even if the nut 245 should somehow unthread itself and succeed in moving the pawl 265 axially, the latter would ultimately strike a face 297 defining one end of the slot 263 at which time further axial movement of the pawl is prevented and the nut would not separate from he the bolt 243. Of course, it is possible that in some orientations the weight of the pawl would be sufficient to provide the necessary impetus for the radial inward movement of the pawl as the pawl is moved toward the face 297. In any event, the pawl 265 can be manually moved radially inwardly to a retracted position to thereby permit intentional separation of the nut 245 from the bolt 243.

Although exemplary embodiments of the invention have been shown and described, many changes, modifications, and substitutions may be made by one having ordinary skill in the art without necessarily departing from the spirit and scope of the invention.

I claim:
1. A bolt comprising:
   a. a head having a shank extending axially outwardly from said head terminating in an end face, said head further having an inner surface directed toward said end face and defining a plane surface substantially perpendicular to said axially extending shank;
   b. a generally radially extending recess opening at the circumferential periphery of the shank terminating radially inwardly from said circumferential periphery and terminating axially outwardly from said head;
   c. a pawl mounted at least partially within said recess for generally radial movement between an extended position and a retracted position;
   d. said pawl having an inner end face directed toward said head and defining a plane surface substantially parallel with said head plane surface so that said pawl is unmovable from the extended position to the retracted position by forces directed generally axially against said pawl inner end face;
   e. said pawl having a cam surface which extends radially inwardly as it extends axially outwardly toward said end face;
   f. a pair of concentrically arranged coil compression springs disposed within said recess generally radially of said pawl urging said pawl toward the extended position, said springs resiliently yieldable in response to a generally radially directed force against said pawl when said pawl is n the extended position;
   g. a stop formed integrally with said shank; and
   h. a shoulder on said pawl engageably with said stop to prevent said pawl from being forced out of said recess by said springs.

2. A bolt as defined in claim 1 in which said shank has a generally radial bore therein for receiving a locking pin, said bore being axially spaced from said recess and the axes of said bore and said recess being offset in a circumferential direction.

3. A bolt as defined in claim 1 wherein a region of the peripheral surface of said shank is at least substantially flat and devoid of threads at said recess so that a greater portion of said pawl is exposed.

4. The bolt of claim 1 in which said shank has male threads thereon and adapted to engage a nut having female threads thereby defining a portion of said shank between said head and said nut being subjected to forces as a result of retaining members, said shank having a segment projecting axially outwardly beyond said nut, said segment of said shank having said recess therein.

5. The bolt of claim 4 in which said recess has inner and outer axial ends, said inner axial end lying intermediate said end face and a location in substantial radial alignment with an outer face of said nut so that said recess does not weaken the portion of the shank to which tension forces are applied in a connecting mode.

6. The bolt of claim 5 in which said inner axial end and said pawl are spaced axially outwardly of said nut when the nut tightly connects the members.